US012597789B2

(12) United States Patent     (10) Patent No.: US 12,597,789 B2

Zhang et al.     (45) Date of Patent: Apr. 7, 2026

(54) HORIZONTALLY-CHARGING SMART ACOUSTIC SYSTEM

(71) Applicant: JIANGXI TAIDE INTELLIGENCE TECHNOLOGY CO., LTD., Fuzhou (CN)

(72) Inventors: Qian Zhang, Fuzhou (CN); Yao Ge, Fuzhou (CN)

(73) Assignee: JIANGXI TAIDE INTELLIGENCE TECHNOLOGY CO., LTD., Fuzhou (CN)

( * ) Notice: Subject to any disclaimer, the term of this patent is extended or adjusted under 35 U.S.C. 154(b) by 141 days.

(21) Appl. No.: 18/598,911

(22) Filed: Mar. 7, 2024

(65) Prior Publication Data

US 2025/0202255 A1    Jun. 19, 2025

(30) Foreign Application Priority Data

Dec. 14, 2023    (CN) .......................... 202323414078.1

(51) Int. Cl.
   *H02J 7/70*      (2026.01)
   *H04R 1/02*      (2006.01)
           (Continued)

(52) U.S. Cl.
   CPC .............. *H02J 7/751* (2026.01); *H04R 1/025* (2013.01); *H04R 1/04* (2013.01); *H04R 3/00* (2013.01); *H04R 9/025* (2013.01); *H04R 9/08* (2013.01)

(58) Field of Classification Search
   CPC ......... H02J 7/0045; H04R 1/025; H04R 1/04; H04R 3/00; H04R 9/025; H04R 9/08; H04R 1/08
   See application file for complete search history.

(56) References Cited

U.S. PATENT DOCUMENTS 4,805,730 A   *   2/1989   O'Neill .................... H04R 1/02
                                        312/111
D690,286 S   *   9/2013   Petersen ................... D14/209.1
                    (Continued)

FOREIGN PATENT DOCUMENTS

CN      218241297 U   *   1/2023    ............... G10H 1/36

*Primary Examiner* — Oyesola C Ojo

(74) *Attorney, Agent, or Firm* — Schwabe, Williamson & Wyatt, P.C.

(57) ABSTRACT

A horizontally-charging smart acoustic system includes a magnetic microphone, an interior of the magnetic microphone is provided with a microphone internal magnetic assembly and a flip speaker assembly. An exterior of the magnetic microphone is provided with multiple charging rings arranged along an axial direction of the magnetic microphone. The flip speaker assembly includes a speaker base provided with a microphone accommodating groove, a speaker internal magnetic assembly mounted under the microphone accommodating groove and arranged in correspondence to the microphone internal magnetic assembly, a charging probe assembly protruding into the microphone accommodating groove and in an electrical connection with each charging ring, and an upper cover assembly in a hinged connection with the speaker base. The horizontally-charging smart acoustic system provided in the present application can effectively solve the problem that the existing smart speaker cannot charge the microphone and causes a bad user experience.

8 Claims, 4 Drawing Sheets

(51) Int. Cl.
| | | |
|---|---|---|
| *H04R 1/04* | (2006.01) | |
| *H04R 3/00* | (2006.01) | |
| *H04R 9/02* | (2006.01) | |
| *H04R 9/08* | (2006.01) | |

(56)  References Cited

U.S. PATENT DOCUMENTS

| | | | | |
|---|---|---|---|---|
| 10,873,797 | B2 * | 12/2020 | Winton | H04R 1/026 |
| 2011/0216093 | A1 * | 9/2011 | Griffin | H04M 1/0279 |
| | | | | 345/659 |
| 2014/0044286 | A1 * | 2/2014 | Coles | G06F 1/1694 |
| | | | | 381/150 |
| 2014/0233742 | A1 * | 8/2014 | Giustina | H04R 5/04 |
| | | | | 381/59 |
| 2014/0337035 | A1 * | 11/2014 | Kessler | G01N 27/041 |
| | | | | 704/274 |
| 2015/0115877 | A1 * | 4/2015 | Arai | H02J 50/60 |
| | | | | 320/108 |
| 2017/0214989 | A1 * | 7/2017 | Harms | H04R 1/026 |
| 2020/0036229 | A1 * | 1/2020 | Pinciuc | H02J 50/12 |
| 2020/0409410 | A1 * | 12/2020 | Kawaguchi | H04R 5/02 |
| 2021/0113725 | A1 * | 4/2021 | Etter | A61L 2/24 |
| 2021/0127746 | A1 * | 5/2021 | Tatsuta | A24F 40/90 |
| 2021/0250679 | A1 * | 8/2021 | Franzén | H04R 1/14 |

* cited by examiner

HORIZONTALLY-CHARGING SMART ACOUSTIC SYSTEM

CROSS REFERENCE TO RELATED APPLICATIONS

This application claims the priorities to Chinese patent application No. 202323414078.1, titled "HORIZON-TALLY-CHARGING SMART ACOUSTIC SYSTEM", filed with the China National Intellectual Property Administration on Dec. 14, 2023, the entire disclosure of which is hereby incorporated by reference.

FIELD

The present application relates to the technical field of telecommunication, and in particular to a horizontally-charging smart acoustic system.

BACKGROUND

In general, a smart acoustic system includes a microphone for collecting sounds and a smart speaker for playing sounds. In order to facilitate accommodating the microphone, some manufacturers provide an accommodating groove in the smart speaker for accommodating the microphone.

The existing accommodating groove does not have the function of charging the microphone, which causes a bad user experience. Therefore, improvements on the existing smart acoustic system are required to solve the problem that the system cannot charge the microphone and causes a bad user experience.

The above information disclosed in the Background is included only to enhance understanding of the context of the disclosure, and therefore may contain information that does not form the prior art that is currently known to those skilled in the art.

SUMMARY

An object of the present application is to provide a horizontally-charging smart acoustic system, which effectively solves the problem that the existing smart speaker cannot charge the microphone and causes a bad user experience.

To achieve the above object, a horizontally-charging smart acoustic system is provided according to the present application. The horizontally-charging smart acoustic system includes a magnetic microphone and a flip speaker assembly. An interior of the magnetic microphone is provided with a microphone internal magnetic assembly, and an exterior of the magnetic microphone is provided with multiple charging rings arranged along an axial direction of the magnetic microphone. The flip speaker assembly includes a speaker base provided with a microphone accommodating groove, a speaker internal magnetic assembly mounted under the microphone accommodating groove and arranged in correspondence to the microphone internal magnetic assembly, a charging probe assembly protruding into the microphone accommodating groove and in an electrical connection with each charging ring, and an upper cover assembly in a hinged connection with the speaker base.

In an embodiment, the magnetic microphone includes an insulation housing, each charging ring is fixedly arranged on the insulation housing, and an insulation ring is arranged between two adjacent charging rings.

In an embodiment, the magnetic microphone is provided with multiple annular grooves, and each charging ring is located in one annular groove.

In an embodiment, a battery holder is provided in the insulation housing, and a circuit board in an electrical connection with each charging ring is fixedly arranged at one side of the battery holder.

In an embodiment, the other side of the battery holder is provided with a battery compartment in an electrical connection with the circuit board.

In an embodiment, the microphone internal magnetic assembly is mounted and fixed on the battery holder.

In an embodiment, both the microphone internal magnetic assembly and the speaker internal magnetic assembly are of an arc structure.

In an embodiment, a fixation plate is arranged at an interior of the speaker base, and the speaker internal magnetic assembly is mounted on the fixation plate.

In an embodiment, the magnetic microphone further includes a button assembly mounted on the insulation housing, and when the microphone internal magnetic assembly and the speaker internal magnetic assembly are magnetically attracted to each other, the button assembly faces upwards.

The beneficial effects of the present application lie in that, a horizontally-charging smart acoustic system is provided, such that when the magnetic microphone is put in the microphone accommodating groove, the charging probe assembly is in a conductive connection with each charging ring to locate the magnetic microphone.

Further, since the microphone internal magnetic assembly and the speaker internal magnetic assembly are magnetically attracted to each other, the magnetic microphone is tightly attached in the microphone accommodating groove, and the charging rings can keep pressing the charging probe assembly tightly, which further prevents poor contact between the charging ring and the charging probe assembly due to the magnetic microphone being jolted during transportation.

Therefore, the horizontally-charging smart acoustic system provided in the present application can effectively solve the problem that the existing smart speaker cannot charge the microphone and causes a bad user experience.

BRIEF DESCRIPTION OF THE DRAWINGS

For more clearly illustrating the technical solutions in the embodiments of the present application or in the conventional technology, drawings referred to describe the embodiments or the conventional technology will be briefly described hereinafter. Apparently, the drawings in the following description are only some examples of the present application, and for those skilled in the art, other drawings may be obtained based on these drawings without any creative efforts.

Figure 1:
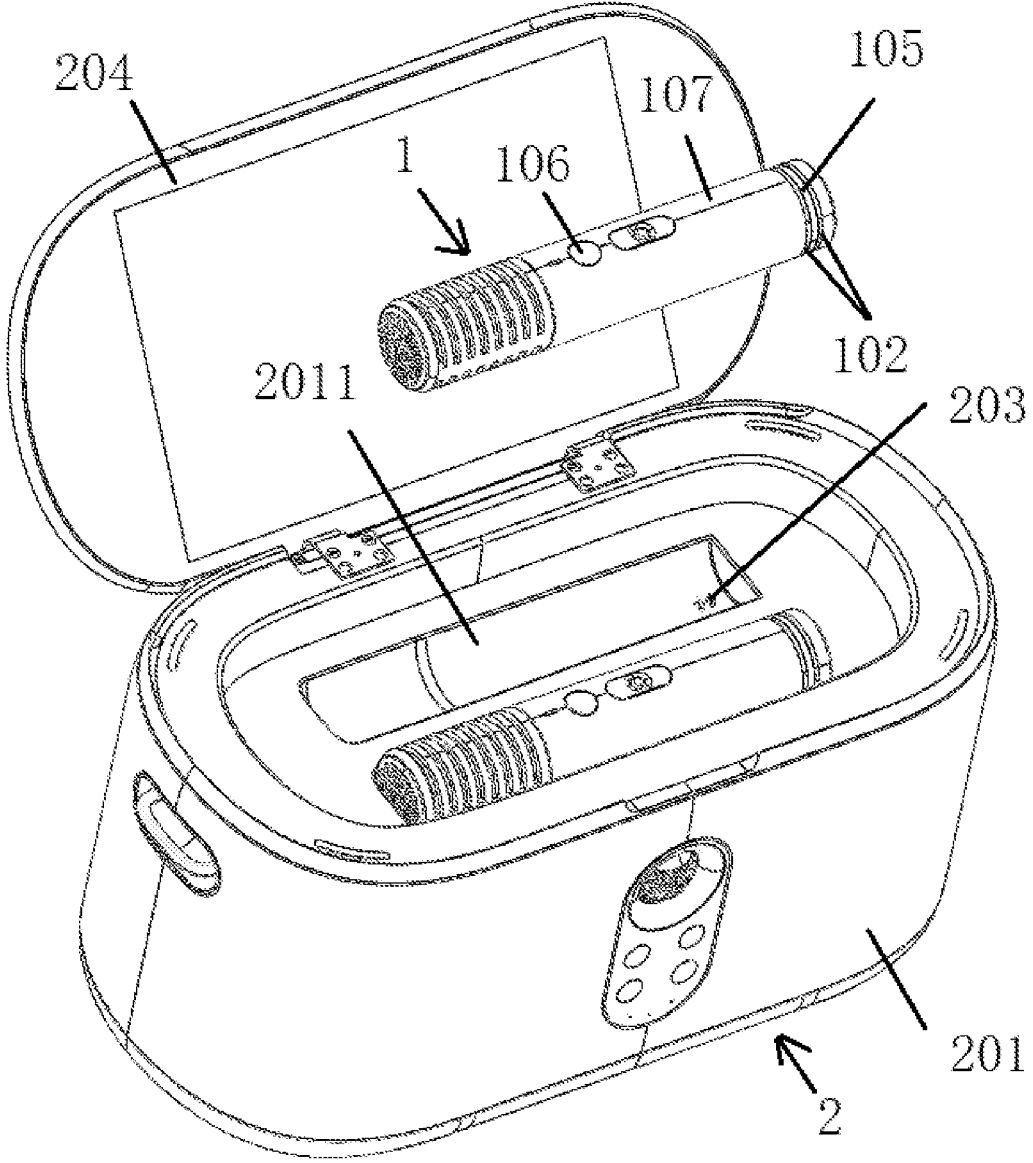
FIG. 1 is a schematic view of a structure of a horizontally-charging smart acoustic system according to an embodiment.

REFERENCE NUMERALS 1 magnetic microphone,
101 microphone internal magnetic assembly, 102 charging ring, 103 battery holder, 1031 battery compartment, 104 circuit board, 105 insulation ring, 106 button assembly, 107 insulation housing, 2 flip speaker assembly, 201 speaker base, 2011 microphone accommodating groove, 202 speaker internal magnetic assembly, 203 charging probe assembly, 204 upper cover assembly, 205 fixation plate.

DETAILED DESCRIPTION OF THE EMBODIMENTS

Technical solutions according to the embodiments of the present application will be described clearly and completely as follows in conjunction with the accompany drawings in the embodiments of the present application, so that purposes, characteristics and advantages of the present application can be more obvious and understandable. It is obvious that the described embodiments are only a part of the embodiments according to the present application, rather than all of the embodiments. All the other embodiments obtained by those skilled in the art based on the embodiments in the present application without any creative work belong to the scope of protection of the present application.

In the description of the present application, it should be appreciated that, when a component is said to be "connected" to another component, it may be directly connected to the other component or there may be an intermediate component present at the same time. When a component is said to be "arranged" at another component, it may be directly arranged at the other component or there may be an intermediate component present at the same time.

The orientation or positional relationships indicated by terms such as "long", "short", "inner", "outer", and the like are based on the orientation or positional relationships shown in the drawings, and are merely for the convenience of describing the present application, and do not indicate or imply that the device or element referred to must have a particular orientation, or be configured and operated in a particular orientation, which therefore should not be construed as a limitation to the scope of the present application.

The present application is described in detail hereinafter in conjunction with the embodiments illustrated in the drawings. The embodiments do not limit the present application, and any variations made to the structure, method and function by those skilled in the art according to the embodiments belong to the scope of protection of the present application.

The present application provides a horizontally-charging smart acoustic system for application scenarios such as singing or the like, which can effectively solve the problem that the existing smart speaker cannot charge the microphone and causes a bad user experience.

Figure 2:
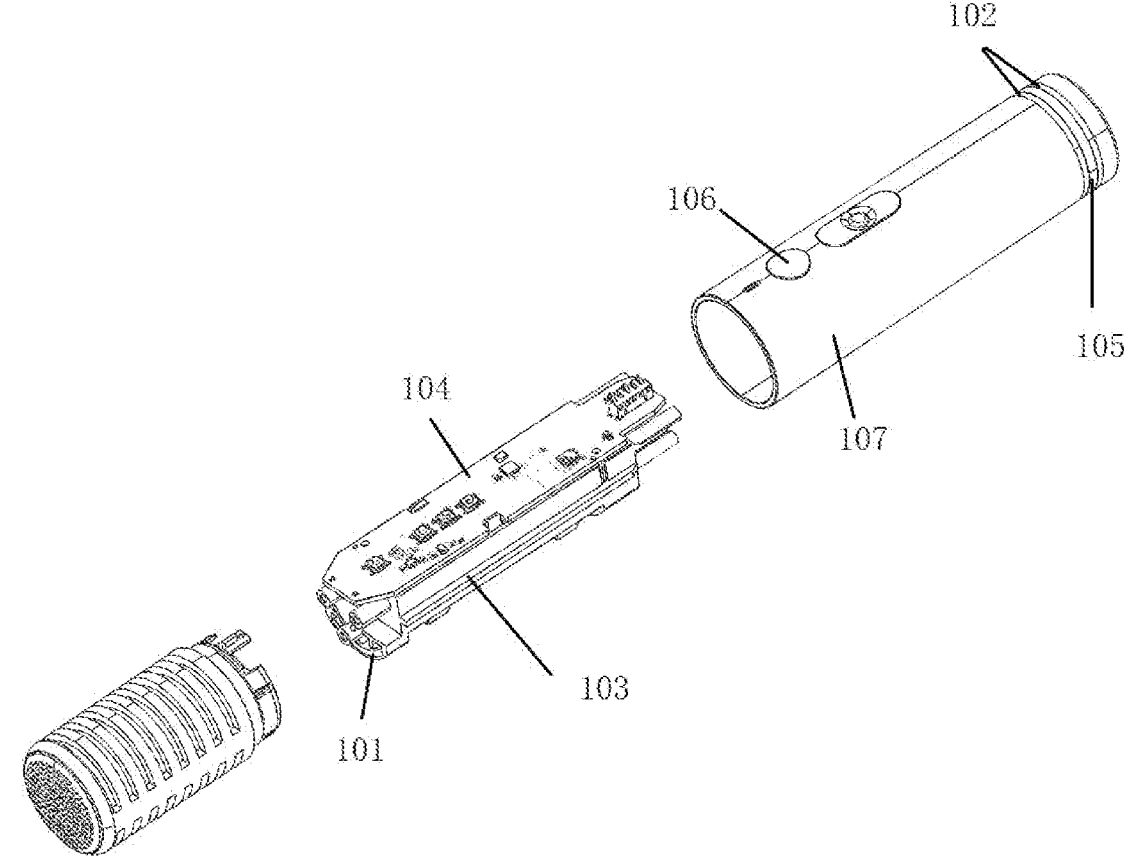
FIG. 2 is an exploded schematic view of a magnetic microphone according to an embodiment.
Figure 3:
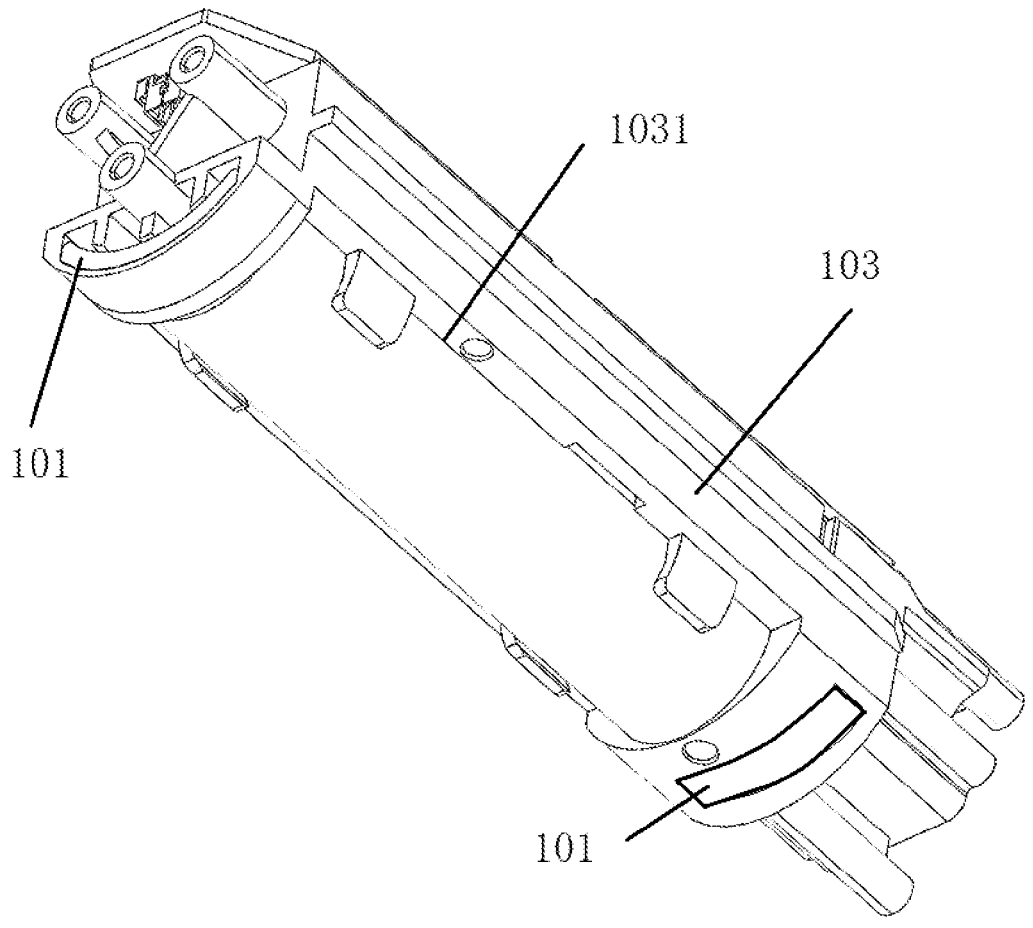
FIG. 3 is a schematic view of a structure of a battery holder according to an embodiment.
Figure 4:
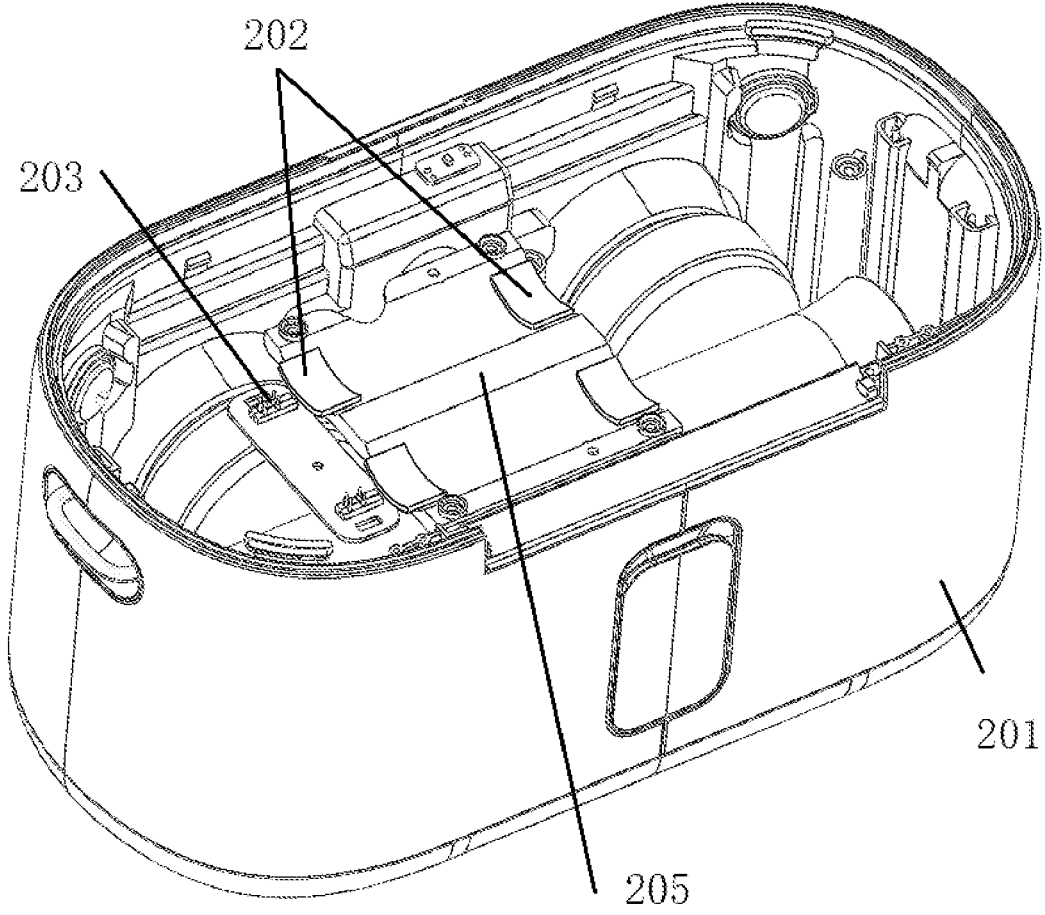
FIG. 4 is a schematic view of a structure of a flip speaker assembly according to an embodiment.

Referring to FIGS. 1 to 4, the horizontally-charging smart acoustic system according to the present embodiment includes a magnetic microphone 1 and a flip speaker assembly 2. An interior of the magnetic microphone 1 is provided with a microphone internal magnetic assembly 101, and an exterior of the magnetic microphone 1 is provided with multiple charging rings 102 arranged along an axial direction of the magnetic microphone 1. The flip speaker assembly 2 includes a speaker base 201 provided with a microphone accommodating groove 2011, a speaker internal magnetic assembly 202 mounted under the microphone accommodating groove 2011 and arranged in correspondence to the microphone internal magnetic assembly 101, a charging probe assembly 203 protruding into the microphone accommodating groove 2011 and in an electrical connection with each charging ring 102, and an upper cover assembly 204 in a hinged connection with the speaker base 201.

It may be appreciated that, when the magnetic microphone 1 is put in the microphone accommodating groove 2011, the charging probe assembly 203 is in an electrical connection with each charging ring 102 to further position the magnetic microphone 1.

Further, since the microphone internal magnetic assembly 101 and the speaker internal magnetic assembly 202 are magnetically attracted to each other, the magnetic microphone 1 is tightly attached in the microphone accommodating groove 2011, and the charging rings 102 can keep pressing the charging probe assembly 203 tightly, which further prevents poor contact between the charging ring 102 and the charging probe assembly 203 due to the magnetic microphone 1 being jolted during transportation.

Therefore, the horizontally-charging smart acoustic system provided in the present application can effectively solve the problem that the existing smart speaker cannot charge the microphone and causes a bad user experience.

Optionally, the microphone internal magnetic assembly 101 and the speaker internal magnetic assembly 202 may both be magnets, the poles of which are opposite; or one is a magnet, and the other is an iron sheet.

In the present embodiment, the magnetic microphone 1 includes an insulation housing 107, each charging ring 102 is fixedly arranged on the insulation housing 107, and an insulation ring 105 is arranged between two adjacent charging rings 102 to prevent a shorted connection between different charging rings 102.

Further, the magnetic microphone 1 is provided with multiple annular grooves, and each charging ring 102 is located in one annular groove such that each charging ring 102 is located relatively.

Optionally, a battery holder 103 is arranged in the insulation housing 107. One side of the battery holder 103 is fixedly provided with a circuit board 104 in an electrical connection with each charging ring 102, and the other side of the battery holder 103 is provided with a battery compartment 1031 in an electrical connection with circuit board 104. The microphone internal magnetic assembly 101 is mounted and fixed on the battery holder 103.

Generally, the magnetic microphone 1 is of a cylinder structure. Since the microphone internal magnetic assembly 101 is mounted and fixed on the battery holder 103, the microphone internal magnetic assembly 101 is of an arc structure, which is beneficial to reducing the size of the magnetic microphone 1, and further improving the compactness of the overall structure of the magnetic microphone 1. Further, in order to increase the magnetic attraction force between the microphone internal magnetic assembly 101 and the speaker internal magnetic assembly 202, the internal magnetic assembly 202 is also of an arc structure.

Further, a fixation plate 205 is arranged at an interior of the speaker base 201, and the speaker internal magnetic assembly 202 is mounted on the fixation plate 205.

In the present embodiment, the magnetic microphone 1 further includes a button assembly 106 mounted on the insulation housing 107. When the microphone internal magnetic assembly 101 and the speaker internal magnetic assembly 202 are magnetically attracted to each other, the button assembly 106 faces upwards.

It may be appreciated that, both the microphone internal magnetic assembly 101 and the speaker internal magnetic assembly 202 are of an arc structure. Thus, when the magnetic microphone 1 is put in the microphone accommodating groove 2011, the magnetic force between the microphone internal magnetic assembly 101 and the speaker internal magnetic assembly 202 makes the magnetic microphone 1 rotate adaptively, such that the microphone internal magnetic assembly 101 exactly faces the speaker internal magnetic assembly 202, and further makes the button assembly 106 face upwards.

The horizontally-charging smart acoustic system provided in the present application has advantages as follows.

1. When the magnetic microphone 1 is put in the microphone accommodating groove 2011, the charging probe assembly 203 is in a conductive connection with each charging ring 102 to locate the magnetic microphone 1;

2. The magnetic microphone 1 can be tightly attached in the microphone accommodating groove 2011, and the charging ring 102 can keep pressing the charging probe assembly 203 tightly, which further prevents poor contact between the charging ring 102 and the charging probe assembly 203 due to the magnetic microphone 1 being jolted during transportation; and 3. Both the microphone internal magnetic assembly 101 and the speaker internal magnetic assembly 202 are of an arc structure, and when the magnetic microphone 1 is put in the microphone accommodating groove 2011, the magnetic force between the microphone internal magnetic assembly 101 and the speaker internal magnetic assembly 202 makes the magnetic microphone 1 rotate adaptively, such that the microphone internal magnetic assembly 101 exactly faces the speaker internal magnetic assembly 202, and further makes the button assembly 106 face upwards.

It should be appreciated that, although the embodiments are described in the present specification, it does not mean that each embodiment only includes one independent technical solution. The description manner of the specification is merely for clearance, and those skilled in the art are supposed to take the specification as a whole. Further embodiments of the present application understood by those skilled in the art can be made by combining the technical solutions of various embodiments.

The descriptions in detail hereinbefore are merely specific descriptions for feasible implementations of the present application, and are not intended to limit the scope of the present application. Any modifications and equivalent implementations made to the above embodiments without departing from the spirit of the present application are deemed to fall into the scope of the present application.

The invention claimed is:

1. A horizontally-charging smart acoustic system, comprising:
    a magnetic microphone, and a flip speaker assembly,
    wherein an interior of the magnetic microphone is provided with a microphone internal magnetic assembly, and an exterior of the magnetic microphone is provided with a plurality of charging rings arranged along an axial direction of the magnetic microphone;
    wherein the flip speaker assembly comprises a speaker base provided with a microphone accommodating groove, a speaker internal magnetic assembly mounted under the microphone accommodating groove and arranged in correspondence to the microphone internal magnetic assembly, a charging probe assembly protruding into the microphone accommodating groove and in an electrical connection with each charging ring, and an upper cover assembly in a hinged connection with the speaker base; and
    wherein the magnetic microphone comprises an insulation housing, each charging ring is fixedly arranged on the insulation housing, and an insulation ring is arranged between two adjacent charging rings.

2. The horizontally-charging smart acoustic system according to claim 1, wherein the magnetic microphone is provided with a plurality of annular grooves, and each charging ring is located in one annular groove.

3. The horizontally-charging smart acoustic system according to claim 1, wherein a battery holder is provided in the insulation housing, and a circuit board in an electrical connection with each charging ring is fixedly arranged at one side of the battery holder.

4. The horizontally-charging smart acoustic system according to claim 3, wherein the other side of the battery holder is provided with a battery compartment in an electrical connection with the circuit board.

5. The horizontally-charging smart acoustic system according to claim 4, wherein the microphone internal magnetic assembly is mounted and fixed on the battery holder.

6. The horizontally-charging smart acoustic system according to claim 5, wherein both the microphone internal magnetic assembly and the speaker internal magnetic assembly are of an arc structure.

7. The horizontally-charging smart acoustic system according to claim 6, wherein a fixation plate is arranged at an interior of the speaker base, and the speaker internal magnetic assembly is mounted on the fixation plate.

8. The horizontally-charging smart acoustic system according to claim 6, wherein the magnetic microphone further comprises a button assembly mounted on the insulation housing, and when the microphone internal magnetic assembly and the speaker internal magnetic assembly are magnetically attracted to each other, the button assembly faces upwards.

* * * * *